Feb. 11, 1936. A. KREMMLING 2,030,642
MOLD FOR MOLDING OR EMBOSSING OR THE LIKE PLASTIC MATERIAL SUCH AS DOUGH
Filed April 7, 1933

A. Kremmling
INVENTOR
By Marks & Clerk
ATTYS.

Patented Feb. 11, 1936

2,030,642

UNITED STATES PATENT OFFICE 2,030,642

MOLD FOR MOLDING OR EMBOSSING OR THE LIKE PLASTIC MATERIAL SUCH AS DOUGH

Aribert Kremmling, Hammersleben, near Oschersleben, Germany

Application April 7, 1933, Serial No. 665,010
In Germany October 5, 1932

1 Claim. (Cl. 107—19)

This invention relates to molds or molding elements for use in molding or embossing plastic material, such as dough, marzipan or the like, wherein the material is pressed into the mold, and an object of the invention is to provide an improved embossing mold in which the embossed articles may be easily released from the mold, leaving the latter in a clean condition ready for a subsequent operation.

A further object is to provide an improved method of forming an embossing mold so that a series thereof may be readily prepared from a master matrix.

The invention consists in a mold for molding or embossing plastic material (such as dough, marzipan or the like) under pressure, wherein the mold surface is other than metal and of a material which may be cast or itself molded under a moderate heat and which is preferably inherently non-adhesive with respect to the plastic material, and wherein the mold or mold surface is mounted or enclosed or reinforced by a metal or other support.

The mold or mold surface may be sulphur, or sulphur or like compositions inherently non-adhesive to dough, marzipan or the like.

It is known to employ metal molds for embossing plastic material under pressure by which it has been possible to operate upon doughs suitably prepared so that the molded pieces can be readily withdrawn, but it has not been possible to use such molds with very sticky doughs, i. e. doughs which are not tough, for the reason that small pieces of the material adhered to the mold to which fresh material was constantly being added with the result that after working for quite a short time the molded articles remained stuck in the mold and could not be released mechanically so that the machine had to be frequently stopped to clean molds.

This difficulty was particularly noticeable when working upon marzipan and it was found practically impossible after pressing the marzipan into the mold to release it therefrom without damage. Consequently the production of confectionery articles from marzipan or the like materials by pressing into an embossing mold has not been a practical proposition hitherto.

These disadvantages are eliminated by the improved mold according to the present invention as it is found that when using a mold formed of sulphur for instance, the substances being worked upon do not adhere to the molding surfaces for the reason that sulphur has a normal greasy, smooth character and the molding surface constantly becomes greasier and smoother as the embossing goes on and thus no portion of the substance being molded remains adhering to it.

Similar results are obtained when the mold or embossing surface is formed of celluloid or rubber.

The mold or embossing surface according to the invention may also be formed of soft or flexible rubber supported or encased by a metal or other framework. In this case the flexibility of the rubber may assist in the release of the molded and embossed articles.

In the accompanying drawing:—

Figure 1:
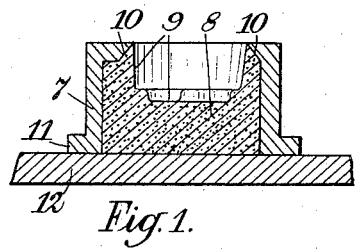
Figures 1 and 2 are sectional elevation and plan of an embossing mold according to the invention.
Figure 2:
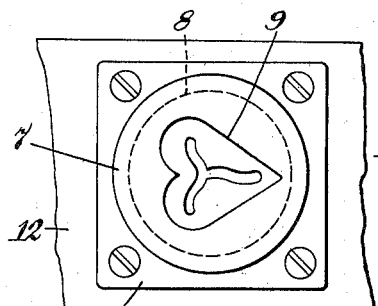

In carrying the invention into effect according to the form shown in Figures 1 and 2, a frame 7 is provided into which a molding and embossing element 8 formed of sulphur is adapted to be introduced by casting or pouring. The molding and embossing surfaces 9 are formed by inserting a master form or matrix into the molding aperture of the frame prior to the casting operation. The melting of the sulphur requires only a moderate degree of heat and after the molding operation becomes hard in a short time so that the embossing mold may be prepared without difficulty.

The upper edge of the frame surrounding the molding aperture is undercut at 10 so that the sulphur element is fully protected at the molding aperture.

The frame 7 is provided with a flange 11 whereby the composite mold may be screwed to a back plate 12 whereby the pressure exerted on the sulphur mold element will be taken up.

Figure 3:
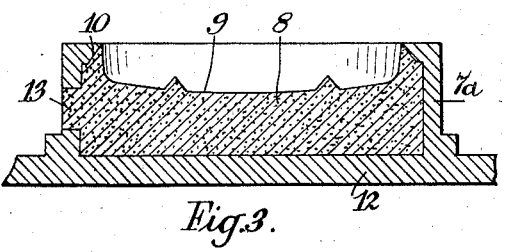
Figures 3 and 4 are sectional elevation and plan of a modified construction of the mold.
Figure 4:
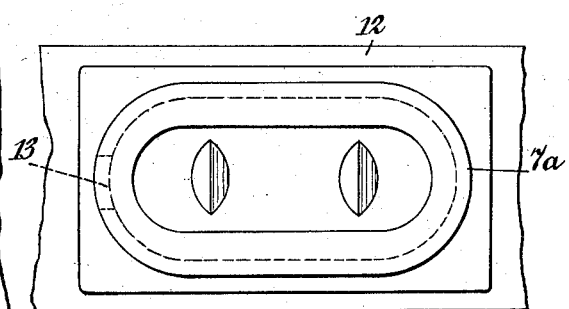

According to the form shown in Figures 3 and 4 the enclosing or reinforcing frame 7a is integral with the back plate 12 and an aperture 13 is provided in the wall of the frame whereby the sulphur or other suitable material may be introduced into the cavity to form the molding and embossing element after the mold aperture has been closed by a matrix.

Figure 5:
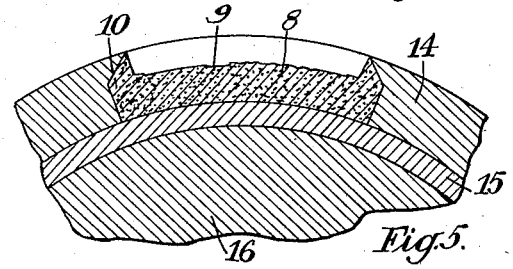
Figures 5 and 6 are sectional elevation and plan showing a mold applied to a rotary drum or roll.
Figure 6:
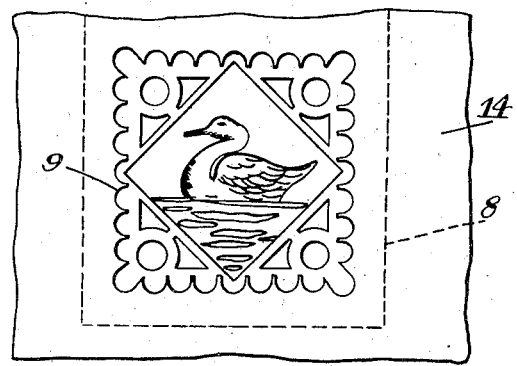

In the form shown in Figures 5 and 6 the sulphur molding and embossing elements 8 are cast in a ring element 14 having a backing cylinder 15 by which the molds are mounted upon a roll 16.

It will be appreciated that in this form a plurality of mold apertures may be provided in the ring 14 and the latter, together with the cylinder 15, will be mounted between side abutments on the roll.

The mold shown in Figures 1 and 2 is suitable for molding and embossing marzipan confectionery, while those indicated in Figures 3 to 6 are suitable for molding and embossing biscuits.

With the mold material enclosed with a frame as indicated it will be appreciated that the mold surface proper is fully protected against damage and that the pressures applied during the molding and embossing operation will be taken up by the walls enclosing the mold element.

The members enclosing the mold element may be formed of metal or other suitable material, while instead of using sulphur, celluloid may be used or hard or soft rubber or other known material which may be suitable for the purpose in view.

It will be found that in a mold or embossing device according to the invention in which the surfaces with which the material contacts are formed of sulphur, or sulphur or like composition, celluloid, rubber or like non-adhesive material the molded and embossed articles will readily be released from the mold without sticking so that the mold is always in a clean condition, whereby repeated stopping of the machine to clean the molds as has been necessary hitherto will be avoided.

Moreover, the molds are inexpensive to produce and readily prepared by closing the mold frame with an element bearing a replica of the desired embossing and then pouring in the molten sulphur and allowing it to cool. Thus any molds having a form or design no longer required may readily be broken up and a mold of different design cast in the frame.

It will be appreciated that the mold may have a plain surface for the production of plain dough shapes instead of embossed shapes as indicated in the drawing.

Having now described my invention what I claim as new and desire to secure by Letters Patent is:—

A rotary molding device comprising a ring element having a recess extending to the outer surface, said recess being provided with undercut edges adjacent said outer surface a molding insert located in said recess and having a mold cavity the surrounding walls of which are covered by said undercut edges, said molding insert being non-metallic and comprising a material which is inherently non-adhesive to dough, marzipan or the like and which is inserted in the ring element by molding under a moderate degree of heat.

ARIBERT KREMMLING.